Aug. 16, 1932.  A. M. ANTICH  1,872,215
RIVETING HOLDER-ON
Filed May 23, 1930   2 Sheets-Sheet 1
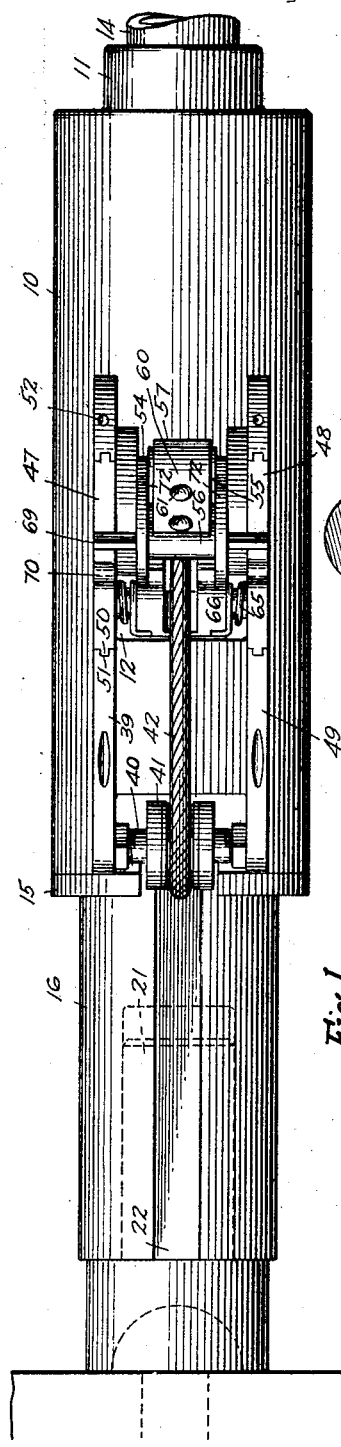
Fig. 1
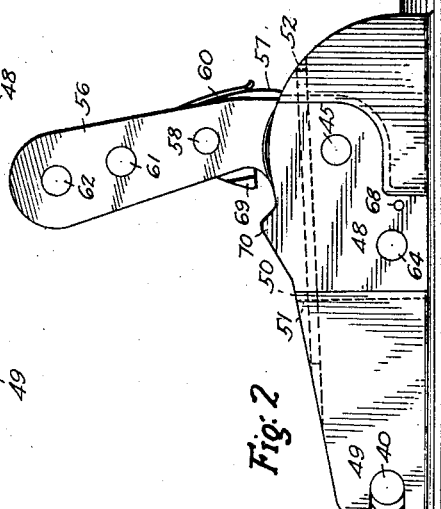
Fig. 2
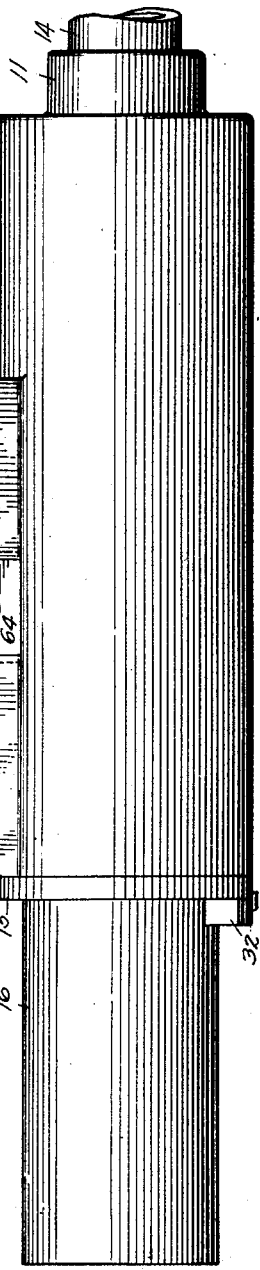
INVENTOR
*Anton Martin Antich*
BY
*Harry Jackson*
ATTORNEY Aug. 16, 1932.  A. M. ANTICH  1,872,215
RIVETING HOLDER-ON
Filed May 23, 1930  2 Sheets-Sheet 2
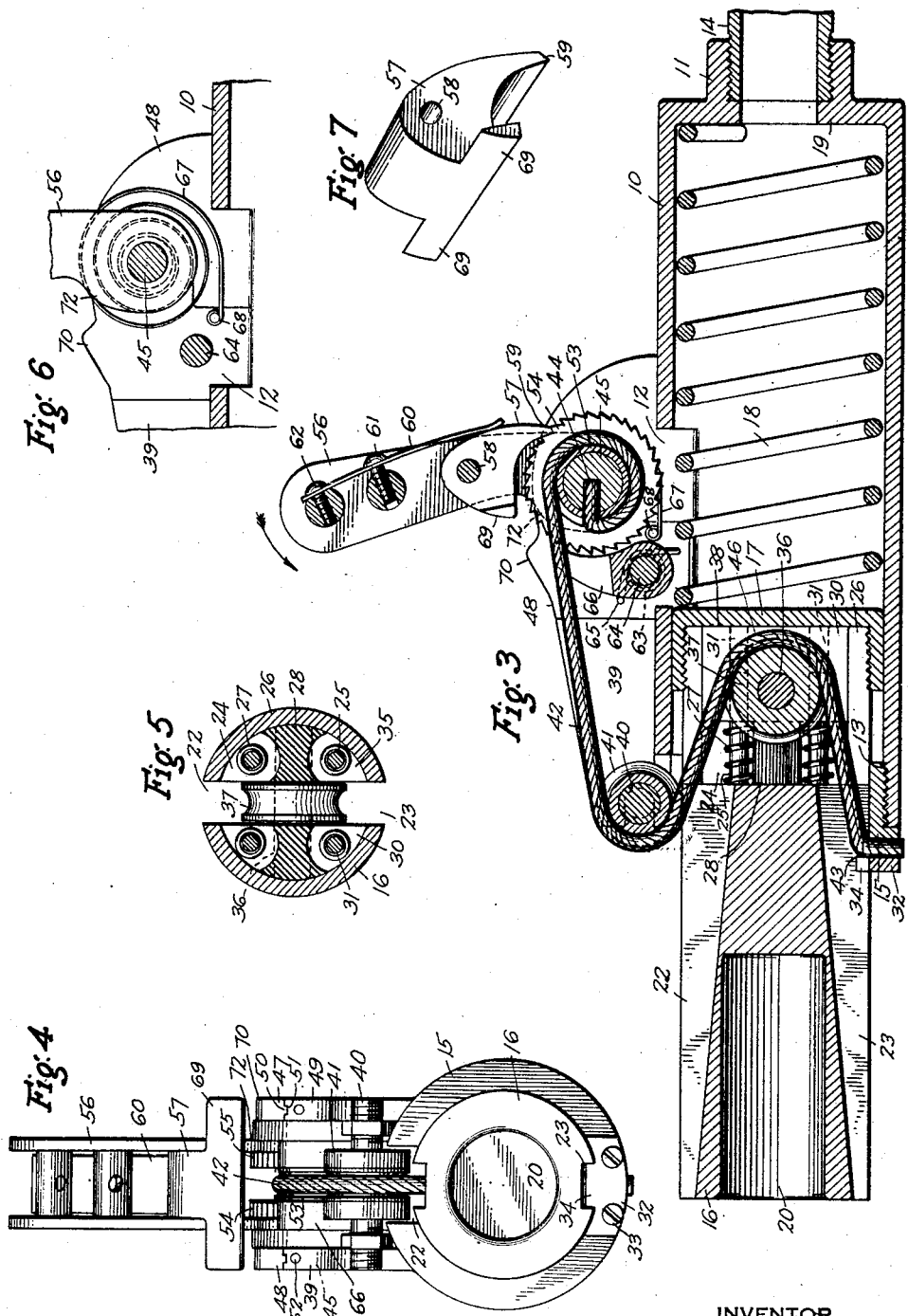
INVENTOR
Anton Martin Antich
BY
ATTORNEY Patented Aug. 16, 1932

1,872,215

UNITED STATES PATENT OFFICE

ANTON MARTIN ANTICH, OF ASBURY PARK, NEW JERSEY, ASSIGNOR OF FORTY PER CENT TO THOMAS SKROZA, OF HARTFORD, CONNECTICUT

RIVETING HOLDER-ON

Application filed May 23, 1930. Serial No. 455,013.

This invention relates to rivet holder-on devices designed to hold and brace the head of a rivet during the riveting operation and is applicable particularly to that type wherein the pressure and shock of the riveting operation is transmitted by suitable bracing means to a stationary object, as distinguished from the type wherein the device is braced against the body of the operator.

My invention contemplates the provision of simple and effective mechanism for arranging the rivet-head holding die or anvil under the desired pressure against the rivet head and for providing a mechanical yieldable connection between the die-holding member and the brace for the device, whereby the necessity for the use of pneumatic mechanism is entirely dispensed with, and shrinkage of the rivet head may be compensated for.

Pneumatic pressure exerted upon the head of the rivet to be effective usually amounts to about eighty pounds per square inch. Where such high pressures are used and the plates to be riveted are thin, as in boilers, the pressure is so great as to slightly buckle the plates inwardly and thereby frequently causes defective riveting. My invention obviates this difficulty by making the pressure exerted by the mechanism upon the rivet head mechanically adjustable to substantially any desired extent.

My invention further contemplates the provision of an elongated, strong and flexible member, such as a steel cable, the effective length of which may be varied, for causing it to exert any desired pressure upon the rivet head, and thereby providing simple, comparatively inexpensive, and effective means which may be readily tensioned or released when desired, and which is not likely to get out of order, for properly holding the rivet without buckling the plates through which the rivet is passed.

The various objects of my invention will be clear from the description which follows and from the drawings, in which Fig. 1 is a top plan view of my improved device.

Fig. 2 is a front view of the same.

Fig. 3 is a vertical longitudinal section thereof.

Fig. 4 is an end or side view thereof.

Fig. 5 is an end view of the yieldably mounted pulley supporting block for the cable.

Fig. 6 is a fragmentary front view partly in section, of a portion of the adjusting handle and of the spring therefor, and Fig. 7 is a perspective view of the winding pawl.

In that practical embodiment of my invention which I have illustrated by way of example, I prefer to provide a substantially cylindrical casing as 10, terminating at its rear end in an internally threaded hub as 11, and internally threaded as at 13 at its other end. An opening as 12 may be provided in the upper cylindrical surface of the casing to allow the winding mechanism soon to be described, to be set as low as possible therein. Into the hub 11, a suitable brace 14 may be screwed. Said brace preferably takes the form of a pipe of sufficient length to abut against a stationary wall or frame such as a post (not shown) on a platform upon which the operator may stand. Since the pipe brace 14 is well known, no further description thereof is deemed necessary.

At its other end, the casing 10 has screwed thereinto the bushing 15 which in turn, slidably receives the die-holder 16, preferably in the form of a partly hollow and slotted cylinder. At one end thereof, the die-holder is closed by the cap retainer 17 screwed thereto, and adapted to retain the yieldable cable-supporting and pressure applying and receiving mechanism in place.

The outer diameter of the cap retainer 17 is preferably substantially the same as the inner diameter of the casing 10, so that as the die-holder 16 is reciprocated into and out of the casing 10, said holder is guided by the engagement of said cap retainer with the inner wall of the casing, said holder or cylinder being further guided in its movement by the bushing 15. To urge the die-holding cylinder toward its outermost or forwardmost position relatively to the casing, I provide a suitable, comparatively heavy though weak coil spring as 18 engaging the cap 17 at one end and at its other end, engaging the end wall 19 of the casing. The spring 18, however, is made of such strength that the cylinder 16 may readily be pushed rearwardly back into the casing manually against the action of the spring when it is desired to do so.

The cylinder 16 is provided at its front end with a concentrically arranged opening 20 to receive the holding die 21, and is slotted radially at diametrically opposite points by means of the slots 22 and 23, to receive the cable 42 in all positions of the cylinder. At its rear end, the cylinder is made hollow to provide an opening 24, surrounded by the wall 26 extending rearwardly and integral with the cylinder. A series of spaced posts as 25 secured to the front end of the opening 24, project rearwardly toward the end of the cylinder but terminate forwardly of said end. Each of the posts carries a coil spring as 27 thereon. Between the posts 25, and extending toward the end of the cylinder, I prefer to arrange a rubber bumper as 28 to supplement the action of the springs and of substantially the same length as the springs.

Mounted on said posts and normally urged forwardly by the springs 27, are the yieldable pulley blocks 30 and 35. Each of said blocks is arcuate on one side to fit the cylindrical wall 26, and flat at its other side. The block is provided with openings 31 into which the posts 25 are inserted, whereby the blocks are guided, for movement under pressure, coaxially of the casing 10.

The blocks 30 and 35 are secured together by means of the stud shaft 36, and are spaced apart sufficiently to receive the pulley 37 for revoluble movement on said shaft.

The cap retainer 17, when screwed on the inner end of the cylinder 16, may be adjusted to engage, and exert pressure upon, the rear ends 38 of the blocks 30 and 35 and thereby to compress the springs 27 and the bumper 28 slightly against the bottom of the opening 24 of the cylinder.

At the forward end of the casing 10, as for example, on suitable upstanding flanges 39 and 49, extending part-way of the length of the casing, is mounted the shaft 40 which carries the loose pulley 41 revolubly mounted thereon, said shaft being suitably secured to the flanges. The pulleys 37 and 41 are designed to guide the cable 42 which is made preferably of steel, in its movement. The extreme forward end 42 of the cable is permanently secured in a suitable recess as 43 in the flange of the bushing 15 as by means of the compression plate 32 held to the bushing flange by the screws 33. The other end 44 of the cable is secured to the winding shaft 45. Said plate 32 may be provided with a radial projection 34 inserted into the slot 23 to prevent rotation of the bushing 15 on the casing, and the end of the cable may be enlarged or riveted to firmly secure it in place in the recess 43.

It will be seen that as the cable is tightened, as for instance, by shortening the cable or winding up its end 44, the loop 46 of the cable urges the pulley 37, the shaft 36 and the blocks 30 and 35 secured thereto, forwardly relatively to the cylinder 16, along the posts 25 and against the action of the springs 27 and of the bumper 28, provided that the rivet head die 21 rests against the head of the rivet.

Further shortening of the cable after the holding-die in the cylinder 16 is against the rivet, increases the outward pressure on the cylinder 16 owing to the increased pressure of the blocks 30 and 35 against the springs 27, the pressure being accurately adjustable to the precise amount desired, without danger of buckling the plates in which the rivet is to be set.

Suitable means are provided for adjusting the effective length of the cable 42 and for transmitting the pressure on the cable to the casing 10 and thence to the brace 14. Said means takes the form of suitable winding mechanism for winding up the cable end 44. Said mechanism is mounted as a unit on the side frames 47 and 48, which are in turn secured to the flanges 39 and 49 upstanding from the casing.

I prefer first to assemble the winding mechanism on the side frames 47 and 48, and then to secure said side frames in place to the flanges. Toward this end, the inner and outer edges of the side frames are tongued as at 50 and enter suitable grooves as 51 in the flanges. A pin as 52 passing through the flanges and through the side frames secures the winding mechanism in proper position.

The shaft 45 of said mechanism is mounted in the side frames 47 and 48, and carries the wind-up pulley 53 near the middle thereof. On one side of said pulley 53 is a ratchet wheel 54, a similar ratchet wheel 55 being arranged on the other side thereof. Straddling the ratchet wheels and loosely mounted on the shaft 45 is the handle 56, provided with one or more suitably shaped cams as 72 on opposite sides of the adjacent ratchet wheels. As the handle 56 is oscillated, the ratchet wheels 54 and 55 are operated in a clockwise direction as viewed in Fig. 3, to wind up the cable end 44 on the pulley 53.

For this purpose, I provide a pawl as 57 pivoted to the handle as at 58 and having a properly shaped toothed end 59 engaging the teeth of the ratchet wheels 54 and 55. A spring as 60 secured to the handle as at 61 and 62 engages the pawl 57, and normally maintains the tooth 59 thereof in its operative position in engagement with the ratchet wheels but yields to allow free movement of the handle in the direction of the arrow of Fig. 3 without rotating said wheels. A pair of spaced retaining pawls 66, spaced apart as by means of the pulley 63, and mounted on the shaft 64 supported in the side frames 47 and 48, are spring-pressed into engagement with the ratchet wheels as by means of coil springs 65. Said pawls serve to prevent loosening of the cable 42 by retaining the ratchet wheels and the shaft 45 stationary during movement of the handle 56 in the direction of the arrow of Fig. 3. A coil spring as 67 having one end secured to the side frame as at 68 and having its other end secured to the shaft 45, tends to urge said shaft in a clock-wise direction as viewed in Fig. 6 and thereby tends to maintain the cable 42 in its tightened position, and tends to maintain the handle in substantially upright position, ready for operation.

It will be understood that it is sometimes desirable to allow the cable 42 to be quickly loosened as for example, when the holder-on is first set into position. For this purpose, the pawl 57 is provided with a pair of projections 69 extending from each side thereof and designed to engage the lug 70 upstanding from each of the side frames 47 and 48, said projections being sufficiently long for that purpose. To release the cable 42 from the operating pawl 57, the handle 56 is rotated in the direction of the arrow of Fig. 3 until the projection 69 strikes the lug 70 and thereby rotates the pawl 57 in a counter-clock-wise direction about its pivot 58 and removes the pawl tooth 59 from the ratchet wheels, on the further slight movement of the handle in the same direction.

Means are also provided for releasing the ratchet wheels at the same time from the retaining pawls 66. Said means comprises the cams 72 secured to and extending from the sides of the handle 56 and mounted on the shaft 45. The cams are so shaped that in the most forwardly position of the handle, said cams engage the pawls 66 above the pivot therefor, and preferably in advance of the engagement of the stationary lugs 70 by the projections 69, whereby the retaining pawls are preferably first lifted from the ratchet wheel, and then the pawl 57 is lifted from said wheels and the shaft 45 thereby freed. The cable 42 may now be pulled forwardly and unwound from the pulley 53, thereby releasing the pressure on the blocks 30 and 35, and allowing the cylinder 16 to be withdrawn from the rivethead and pushed manually into the casing 10 against the action of the spring 16, and the entire device shifted to the next rivet.

In the operation of my improved holder-on, a suitable die is inserted in the opening 20 of the cylinder 16, and the holder-on mounted in place in the usual manner, the cylinder being partly retracted manually into the casing 10 for that purpose. After the holder-on has been set in place approximately, the cylinder is released so that the spring 18 urges the die and the cylinder 16 against the rivet head. The pressure on the rivet head may now be adjusted by reciprocating the handle 56, thereby rotating the shaft 45 in a clock-wise direction and winding up the cable 42 so that the blocks 30 and 35 through the springs 27 exert the required pressure on the cylinder to hold the die firmly against the rivet. As the riveting operation on the unheaded end of the rivet proceeds in the usual manner, the blows transmitted through the rivet to the die and to the cylinder 16 are partly taken up by the springs 27 and the rubber bumper 28, which are restrained at one end by the blocks 30 and 35, said blocks being in turn retained by the cable 42.

The restraint takes the form of outward pressure upon the pulley 37 put thereon when the cable 42 is tightened. The restraint or reaction produced by the holding effect of the cable upon the pulley blocks is partly taken up the guide pulley 41 and thence transmitted to the casing 10 and partly by the shaft 45 and also transmitted to the casing 10. It will be seen that by tightening the cable 42 as the handle 56 is reciprocated, any required pressure may be exerted upon the pulley blocks to hold the cylinder 16 against the rivet head as firmly as may be required. Since the riveting operation causes the heated rivet head to shrink, such shrinkage may be compensated for by merely reciprocating the handle 56, as the operation proceeds, as many times as the judgment of the operator dictates.

It will also be seen that the pressure may be instantaneously released by merely swinging the handle 56 in the direction of the arrow of Fig. 3 until said handle is stopped by the engagement of the pawl projections 69 and the cams 72 with the lugs 70 and the retaining pawls 66, respectively. When the ratchet wheels 54 and 55 are so released, the springs 27 are free to move the pulley blocks 30 and 35 inwardly away from the cylinder 16 and thereby unwind the cable 42 partly from the shaft 45 automatically, the remainder of the unwinding being accomplished by merely pulling on the cable. The cylinder 16 may then be removed from the rivet head by pushing it back into the casing against the spring 18.

It will further be seen that the springs 67 tend to take up any normal slack in the cable so that the handle is at all times ready for operation, when the holder-on is in operative position.

It will further be seen that I have provided a simple and effective device, eliminating the disadvantages of pneumatic holders-on, capable of adjusting the pressure against the rivet, and well-adapted to meet the severe requirements of practical use.

While I have shown and described a certain specific embodiment of my invention, it will be understood that I do not intend to limit myself thereto but intend to claim my invention as broadly as may be permitted by the state of the prior art and the terms of the appended claims.

I claim:

1. In mechanism of the character described, a cylinder adapted to receive a rivethead holding die, a casing in which the cylinder is axially movable inwardly and outwardly, a spring in the casing for urging the cylinder toward its outermost position, a pulley carried at the inner end of the cylinder, a block within the cylinder on which said pulley is mounted, yieldable means interposed between the block and the end wall of the cylinder for urging said block into its innermost position, a cable arranged about the inner part of said pulley, one end of said cable being fixed relatively to the casing and past said pulley, a second pulley on the casing about which said cable is passed, a pulley shaft arranged intermediate of the ends of the casing, a third pulley on said shaft to which the other end of the cable is fixed, a pair of ratchet wheels on said shaft, one of which is disposed on each side of said third pulley, a pair of spring-pressed pawls pivoted to the casing for normally preventing unwinding movement of said pulley, a handle pivotally mounted on the shaft, a spring-pressed operating pawl on the handle for operating said ratchet wheels, and means for disengaging said pawls from the ratchet wheels when the handle is moved toward its outermost position.

2. In mechanism of the character described, a casing, a rivet holding member slidable longitudinally in the casing during operation of the mechanism, a block slidable within said member, yieldable means interposed between the block and the member, and means for adjusting the position of the block relatively to the member and for maintaining said block in its adjusted position including a pulley carried by the block and means for bodily moving the pulley.

3. In a device of the character described, a casing, a rivet holding member movable within the casing, a flexible member operatively connected to the holding member for adjusting the position of the rivet holding member, for applying pressure thereto, and for receiving the pressure put upon the rivet holding member, an oscillatory handle on said casing, means operatively connecting the handle to the other end of the flexible member for tensioning the flexible member including a pair of ratchet wheels, a pair of retaining pawls spring-pressed into engagement with the ratchet wheels, and an operating pawl spring-pressed into engagement with the ratchet wheels, means for removing the retaining pawls from the ratchet wheels and means for removing the operating pawl from the ratchet wheels when the handle is moved into its limiting position.

4. In mechanism of the character described, a casing, a rivet holding member movable in said casing, an elongated flexible member for exerting pressure upon the rivet holding members, means for transmitting the pressure upon the flexible member to the casing, and yieldable means interposed between the flexible member and the rivet holding member, comprising a block movable axially of and relatively to the rivet holding member on the shortening and lengthening of the effective length of the flexible member and normally movable as a unit with said member, posts projecting from the rivet holding member and entering said block for guiding the block, yieldable means adjacent the posts and interposed between the block and the rivet holding member, and a pulley for the flexible member carried by the block.

5. In a riveting holder-on, a casing open at one end thereof, a coil spring in the casing near the other end thereof, a cylinder in the casing projecting through the open end and engaging the end of said spring, a bushing removably secured in the open end of the casing and engaging said cylinder for guiding the same, a pair of substantially parallel spaced side frames upstanding from the casing, an oscillatory handle mounted between said frames and means operatively connected to said handle and to the cylinder for exerting pressure upon the cylinder and for transmitting pressure put upon said cylinder to said casing including a cable fixed at one end to the casing and operatively connected at the other end to said handle, and means for yieldingly and operatively connecting an intermediate portion of the cable to said cylinder.

6. In a riveting holder-on, a casing having a projection thereon, a cylinder within said casing, a cable fixed at one end to said casing and yieldingly and operatively connected to the cylinder, and means on said casing for winding up the other end of said cable, comprising a pulley to which the other end of the cable is secured, a pair of ratchet wheels arranged coaxially of said pulley, a pair of retaining pawls spring-pressed into engagement with the ratchet wheels for normally preventing rotation of said wheels, an oscillatory handle, an operating pawl carried by said handle and spring-pressed into engagement with the ratchet wheels, an extension on said operating pawl adapted to engage said projection on the movement of the handle towards the cylinder to remove said operating pawl from the ratchet wheels, and a cam operatively connected to the handle for removing the retaining pawls from the ratchet wheels at the same time that the operating pawl is so removed.

7. In a riveting holder-on, a casing open at one end thereof, a cylinder in the casing projecting through the open end and adapted to receive the blows of a riveting operation, an oscillatory handle on the casing, and means operatively connected to said handle and to the cylinder for exerting pressure upon the cylinder during the riveting operation and for transmitting the blows received by the cylinder to said casing including a cable operatively connected to the cylinder at one part of its length and operatively connected at another part of its length to said handle, a pulley for said cable adjacent the cylinder, and means for supporting the pulley movable by said cable relatively to the cylinder when movement of the cylinder is halted, and movable with the cylinder as a unit when movement of the cylinder has not been halted, and a yieldable member interposed between the pulley supporting means and the cylinder.

8. In rivet-holding mechanism, adjustable by the operator during the operation thereof, a casing, a cylinder axially movable in said casing, and means for preventing rivet-releasing movement of said cylinder under rapid intermittent axial blows transmitted to the cylinder after it has been positioned against the head of the rivet, comprising a flexible cable adjustably connected to the casing, an oscillatory handle for tightening said cable while the mechanism is holding the rivet to resist the axial blows on the cylinder, and yieldable means interposed between the cable and the cylinder and carried by and within said cylinder for urging said cylinder toward its outermost position relatively to the casing.

9. In mechanism of the character described adapted to receive and react to rapid axial blows thereon delivered by a rivet upon which riveting blows are exerted and adapted to be operated by a single operator, a rivet-die holding cylinder having slots therein, a pulley supported wholly within said cylinder and of less diameter than that of the cylinder, yieldable means for transmitting pressure put upon the pulley to the cylinder while the cylinder is receiving blows, a cable operatively connected to the pulley for exerting pressure upon the yieldable means and arranged for part of its length longitudinally of and in the interior of the cylinder to maintain the cylinder in rivet-holding position, and means including a control handle adapted to be manipulated by the operator for adjusting the pressure exerted by the cable upon the yieldable means while the mechanism is in operation.

ANTON MARTIN ANTICH.